Figure 1:
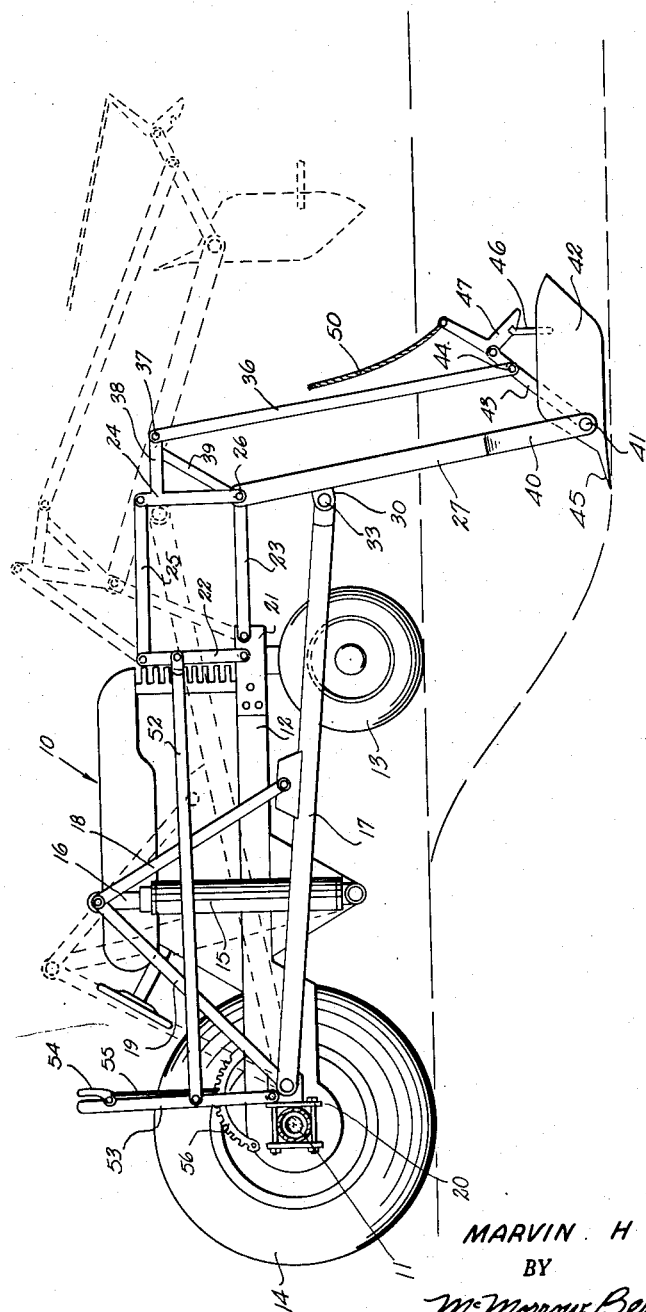

May 17, 1949.  M. H. CRAMER  2,470,147
EXCAVATING MACHINE
Filed Dec. 19, 1947  2 Sheets-Sheet 2

INVENTOR.
MARVIN H. CRAMER,
BY
McMorrow, Berman & Davidson
ATTORNEYS.

Patented May 17, 1949

2,470,147

UNITED STATES PATENT OFFICE 2,470,147

EXCAVATING MACHINE

Marvin H. Cramer, George, Iowa

Application December 19, 1947, Serial No. 792,777

4 Claims. (Cl. 214—138)

This invention relates to improvements in excavating machines and is more particularly directed to an attachment for hoisting apparatus on tractors.

An object of the invention is the provision of an attachment for a hoisting apparatus for not only retaining a scoop in a predetermined position when digging a trench but for raising said scoop in a vertical plane preparatory to dumping the loaded scoop when desired, with incorporated means for varying the angle of inclination of said scoop.

A further object of the invention is the provision of an attachment for a hoisting apparatus on a tractor in which a plurality of bars forming a parallelogram for pivotally supporting a boom has pivotal connections with the tractor, additional members being coordinated with the boom to form a second and longer parallelogram, one of said members having pivotal connections with a bar of the first-mentioned parallelogram so that when a hoisting arm attached to the boom and mounted on the tractor, is oscillated for rocking the boom, said boom will raise rapidly a scoop supported on the lower end of the boom.

The invention consists in the novel construction, arrangement and combinations of parts hereinafter more particularly described and claimed.

Figure 2:
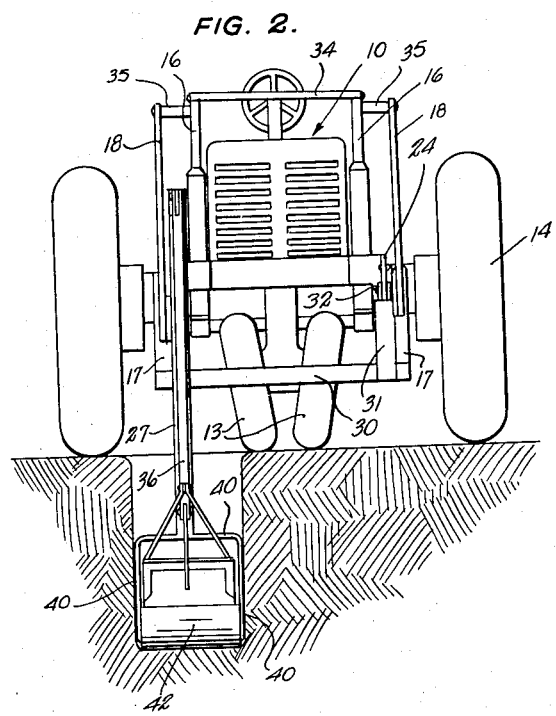
Figure 6:
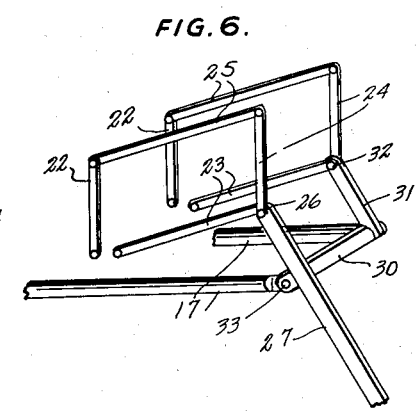
Figure 3:
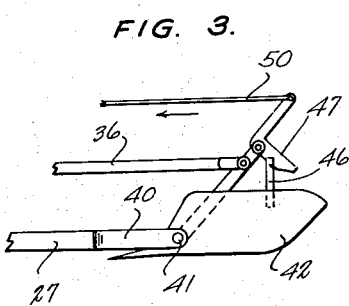
Figure 4:
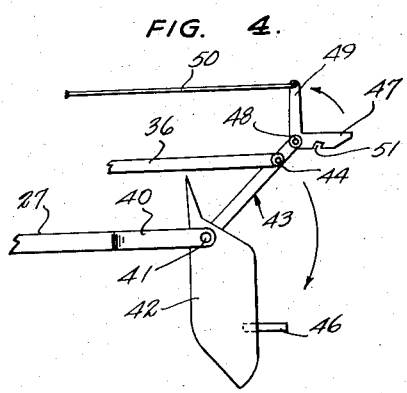
Figure 5:
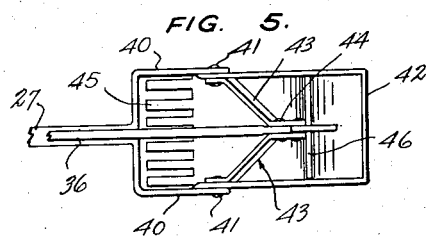

In the drawings,

Figure 1 is a side view in elevation of a tractor and hoisting apparatus showing an attachment for supporting and operating a scoop, Figure 2 is a front view in elevation of the attachment as applied to a tractor, Figure 3 is a fragmentary side view of a scoop and supporting means therefor in an elevated position before dumping, Figure 4 is a fragmentary side view of the scoop and supporting means therefor shown in a released position, Figure 5 is a plan view of the scoop and connections in the position shown in Figure 3, and Figure 6 is a fragmentary view of an arrangement for aiding in elevating a scoop.

Referring more particularly to the drawings, 10 designates generally a farm tractor having a rear axle 11 a frame 12 supported by front wheels 13 and rear wheels 14. The tractor also includes a hoisting apparatus which comprises as its main features, cylinders 15 supplied with a liquid under pressure for operating pistons 16 that raise hoisting arms 17 through links 18 and 19. Said arms are pivoted at one end on plates 20 clamped in any well known manner to the axle 11 at opposite sides of the tractor.

A plate 21 is bolted to each side of the frame 12 with the free ends thereof projecting beyond the front of the tractor (Figures 1 and 2). Four bars 22, 23, 24 and 25 form a parallelogram projecting forwardly from each side of the tractor. Bars 22 and 23 have their adjacent ends pivoted on the extensions 21. Bars 22 and 25 and likewise bars 24 and 25 have the adjacent ends pivotally connected together. The adjacent ends of a pair of the bars 23 and 24 are pivoted on a pin 26 carried by the upper end of a boom 27 at one side of the tractor.

A transverse bar 30 (Figure 2) has one end secured rigidly to an intermediate portion of the boom. The other end of said bar is rigid with a short rod 31, the length of which corresponds to the distance on the boom between the pin 26 and a point where the bar 30 is secured to the boom. The bar 30 and rod 31 cause the parallelogram at the left side of the tractor to move in unison with the parallelogram at the right side of said tractor particularly when the upper end of the rod 31 is pivotally connected at 32 with the lower end of bar 24 at the left side of the tractor.

The outer ends of the hoisting arms 17, one being at each side of the tractor, are pivotally connected at 33 to the ends of the bar 30 (Figure 2). It will be noted that the arms are oscillated simultaneously in view of the fact that the pistons 16 are connected together by a cross bar 34 while trunnions 35 for the upper ends of the pairs of links 18 and 19 are carried by said pistons.

A rod 36 is parallel to the boom 27. The upper end of the rod is pivoted at 37 to the outer end of a bracket consisting of the bars 38 and 39. The inner ends of said bars are attached to the bar 24 (Figure 1). The lower end of the boom is forked to provide a pair of spaced arms 40 which are connected pivotally at 41 exteriorly on the opposite side walls of a scoop 42. A U-shaped member has the inner ends of its legs 43 pivoted also at 41 but interiorly on the walls of the scoop. The lower end of the rod 36 is pivoted at 44 between the outer ends of said legs. The boom 27, the rod 36, the legs 43 and the bracket form a second parallelogram since the distance between the pivots 26 and 37 is equal to the distance between the pivots 41 and 44.

The scoop 42 has a forward cutting edge in the form of sharp teeth 45. The rear portion of said scoop is provided with a bail 46, the legs of which being firmly secured to the opposite side walls of the scoop.

A trip 47 is pivoted at 48 between the upper ends of the legs 43 where said legs are located in close parallel relation. A handle 49 extends upwardly from the trip and a rope 50 secured to said handle is carried rearwardly to the driver's seat. The trip has a notch 51 adapted to receive the bail 46 for retaining the scoop in a horizontal position during digging operations and when said scoop is lifted.

A link 52 (Figure 1) has pivotal connections between the bar 22 and a lever 53 pivoted at its lower end on the frame 12 of the tractor adjacent the driver's seat. A finger lever 54 pivoted on the lever 53 reciprocates a pawl 55 for releasing the same from engagement with the teeth of a rack 56 which is maintained stationary. When the lever 53 is moved forwardly, the bar 22 is rocked forwardly thereby varying the positions of the bars 24 and the bracket including the bars 38 and 39. This action causes the rod 36 and likewise the boom 27 to rock forcing the lower ends thereof to move inwardly and raise the teeth 45 of the scoop. A reverse movement of the lever 53 lowers the teeth.

The operation of my device is as follows, with the parts in the positions shown in Figure 1 and with the scoop loaded, said scoop is ready to be dumped. The necessary valves (not shown) are opened to admit a liquid under pressure to the cylinders 15. The pistons 16 are raised together with the attached links 18 and 19. The hoisting arms 17 are oscillated on their pivots for raising the boom 27 and the attached scoop until said elements reach the dotted line position shown in Figure 1. The cord 50 is then pulled whence the trip 47 releases the bail 46 and the load is dumped after the tractor has been moved.

It will be noted that the radius of the hoisting arms 17 is much greater than the radius of the bars 23. Therefore, when the scoop is elevated, arms 23 will cause the pivot 26 to raise at a slower speed than the bar 30 which is connected to the hoist so that the boom 27 will rock on pivot 33 and thus increase the rate of speed of the raising of the scoop.

As shown in Figure 2, the front wheels 13 are at one side of the trench which is being dug by the scoop 42 so that there is no danger of said wheels slipping into the trench. If necessary planks may be placed along the side wall of the trench nearest the front wheels 13 to prevent said wall from caving in.

What I claim is:

1. In a tractor having a hoisting machine including oscillatable hoisting arms, an apparatus for raising a scoop comprising pairs of bars pivotally connected together to form a parallelogram projecting forwardly from each side of the tractor, the adjacent ends of two of the bars of each parallelogram having pivotal connections with the contiguous side of the tractor frame, a boom swingable from the outer end of one parallelogram, a short rod swingable from the outer end of the other parallelogram, a horizontal bar connecting the lower end of the rod with the boom, the ends of the horizontal bar having hinged connections with the hoisting arms, a rod parallel with the boom, means attached to the adjacently disposed parallelogram connecting the upper ends of the boom and parallel rod for swingably supporting said rod, and means having pivotal connections with the lower ends of the boom and the rod, the pivotal connections between the lower end of the boom and the last mentioned means being carried by the scoop for connecting the scoop to the boom.

2. In a tractor having a hoisting device including oscillatable hoisting arms, an apparatus for raising a scoop comprising pairs of bars arranged to form a parallelogram, the adjacent ends of two bars swingably connected to one side of the tractor frame, the remaining pairs of adjacent ends being pivotally connected together, the parallelogram projecting forwardly of the tractor, a boom swingable from the outer end of the parallelogram, means at the other side of the tractor frame adapted to operate in unison with the parallelogram for aiding in stabilizing the movements of the boom, a horizontal bar connecting the last-mentioned means with the boom, means pivotally connecting the ends of said bar with the juxtapositioned hoisting arms, a rod parallel to the boom, means projecting from the parallelogram and swingably supporting said rod, and means having pivotal connections with the lower ends of the boom and parallel rod, the pivotal connections between the lower end of the boom and the last-mentioned means being carried by the scoop for connecting the scoop to the boom.

3. In a tractor having a hoisting device including oscillatable hoisting arms, an apparatus for raising a scoop comprising pairs of bars arranged to form a parallelogram, the adjacent ends of two bars swingably connected to one side of the tractor frame, the remaining pairs of adjacent ends being pivotally connected together, the parallelogram projecting forwardly of the tractor, a boom swingable from the outer end of the parallelogram, means at the other side of the tractor frame adapted to operate in unison with the parallelogram for aiding in stabilizing the movements of the boom, a horizontal bar connecting the last-mentioned means with the boom, means pivotally connecting the ends of said bar with the juxtapositioned hoisting arms, means embodying a rod arranged in parallel spaced relation with respect to the boom and pivotally connected to the upper end of said boom and said parallelogram for aiding and maintaining the boom in the vertical plane, a scoop pivotally connected to the lower end of said boom, and means pivotally connecting the lower end of said rod to the scoop pivotal connection.

4. In a tractor having a hoisting device including oscillatable hoisting arms, an apparatus for raising a scoop comprising pairs of bars arranged to form a parallelogram, the adjacent ends of two bars swingably connected to one side of the tractor frame, the remaining pairs of adjacent ends being pivotally connected together, the parallelogram projecting forwardly of the tractor, a boom swingable from the outer end of the parallelogram, means at the other side of the tractor frame adapted to operate in unison with the parallelogram for aiding in stabilizing the movements of the boom, a horizontal bar connecting the last-mentioned means with the boom, means pivotally connecting the ends of said bar with the juxtapositioned hoisting arms, means embodying a rod arranged in parallel spaced relation with respect to the boom and pivotally connected to the upper end of said boom and said parallelogram for aiding and maintaining the boom in the vertical plane, a scoop pivotally connected to the lower end of said boom, means pivotally connecting the lower end of said rod to the scoop pivotal connection, and means releasably supporting the rear end of the scoop.

MARVIN H. CRAMER.

REFERENCES CITED

The following references are of record in the file of this patent:

UNITED STATES PATENTS

| Number | Name | Date |
| --- | --- | --- |
| 1,561,694 | Clutter | Nov. 17, 1925 |
| 1,693,809 | Clutter | Dec. 4, 1928 |
| 2,397,530 | Brosius | Apr. 2, 1946 |
| 2,449,212 | Frage | Sept. 14, 1948 |
| 2,449,279 | Conklin | Sept. 14, 1948 |